(12) United States Patent
Liu et al.

(10) Patent No.: US 8,488,557 B2
(45) Date of Patent: Jul. 16, 2013

(54) METHOD FOR DETECTING A DUPLICATE ADDRESS, MOBILE STATION, NETWORK ELEMENT AND COMMUNICATION SYSTEM

(75) Inventors: Fang Liu, Shanghai (CN); Caixia Chi, Shanghai (CN)

(73) Assignee: Alcatel Lucent, Paris (FR)

( * ) Notice: Subject to any disclaimer, the term of this patent is extended or adjusted under 35 U.S.C. 154(b) by 206 days.

(21) Appl. No.: 12/735,351

(22) PCT Filed: Jan. 14, 2008

(86) PCT No.: PCT/CN2008/000088
§ 371 (c)(1),
(2), (4) Date: Aug. 24, 2010

(87) PCT Pub. No.: WO2009/089643
PCT Pub. Date: Jul. 23, 2009

(65) Prior Publication Data
US 2010/0316019 A1 Dec. 16, 2010

(51) Int. Cl.
*H04W 8/26* (2009.01)
*H04L 29/12* (2006.01)
(52) U.S. Cl.
USPC ............ 370/331; 455/436; 709/225; 709/226
(58) Field of Classification Search
CPC ........ H04L 61/20; H04L 61/2046; H04W 8/26
USPC .................. 370/331; 455/436; 709/225, 226
See application file for complete search history.

(56) References Cited

U.S. PATENT DOCUMENTS

| | | | |
|---|---|---|---|
| 7,200,649 B1 | 4/2007 | Batke et al. | |
| 2005/0078635 A1 * | 4/2005 | Choi et al. | ..................... 370/331 |

(Continued)

FOREIGN PATENT DOCUMENTS

| | | |
|---|---|---|
| CN | 1901551 | 1/2007 |
| EP | 1 841 184 | 10/2007 |
| KR | 100789933 | 1/2008 |

OTHER PUBLICATIONS

Search Report for corresponding European Application No. 08700641.7 dated Jul. 20, 2011.

(Continued)

*Primary Examiner* — Ayaz Sheikh
*Assistant Examiner* — Tarell Hampton
(74) *Attorney, Agent, or Firm* — Harness, Dickey & Pierce (57) ABSTRACT

The present invention proposes a method for detecting a duplicate address, a mobile station, a network element for controlling access of a mobile station to a wide area network and a communication network comprising a mobile station and at least two network element, wherein said mobile station is moving from a second access network pertaining to a second network element into a first access network pertaining to a first network element. Said method for detecting a duplicate address comprises: the mobile station sends a request message to the first network element; the first network element generates and sends a first message to the mobile station upon reception of said request message, said first message designating an explicit address configuration and including prefix information; the mobile station checks out the explicit address configuration, generates an address based on said prefix information and sends a message containing the generated address to the first network element for indicating that the mobile station requires registering the generated address with the first network element; and the first network element creates an entry for the mobile station if the generated address is not found in its address table, or generates and sends a second message to the mobile station for indicating that the generated address is a duplicate address if it is found in its address table and discards data packets with the duplicate address sent from the mobile station.

14 Claims, 5 Drawing Sheets

U.S. PATENT DOCUMENTS

| | | | |
|---|---|---|---|
| 2006/0245403 A1* | 11/2006 | Kumar | 370/338 |
| 2008/0024819 A1* | 1/2008 | Tanji | 358/1.15 |
| 2008/0031183 A1* | 2/2008 | Aso et al. | 370/328 |
| 2008/0031278 A1* | 2/2008 | Jang et al. | 370/475 |

OTHER PUBLICATIONS

Jeon et al., "Transmission of IPv6 Packets over Ethernet CS over IEEE 802.16 Network Draft-jeon-ipv6-over-ieee 802.16-ethcs-00. txt," Internet Engineering Task Force (IETF) Draft, Sep. 2006, XP015047072, Section 7.4.

F. Liu et al., "Fast Stateless Address Auto-configuration and Duplicate Address Detection in IPv6 Network Draft-liu-ipv6-fdad-00.txt," Internet Engineering Task Force (IETF) Draft, May 16, 2010, XP015068560, retrieved on May 16, 2010.

International Search Report.

* cited by examiner

Modified RA message format

| Type | Code | | | | Checksum |
|---|---|---|---|---|---|
| Cur Hop Limit | M | O | E | Reserved | Router Lifetime |
| Reachable Time ||||||
| Retrans Timer ||||||
| Prefix Information Option ||||||
| Other Options ... ||||||

Modified NS message format

| Type | | Code | Checksum |
|---|---|---|---|
| E | D | Reserved ||
| Target Address ||||
| Options ... ||||

Modified NA message format

| Type | | | | Code | Checksum |
|---|---|---|---|---|---|
| R | S | O | E | Reserved ||
| Target Address ||||||
| Options ... ||||||

METHOD FOR DETECTING A DUPLICATE ADDRESS, MOBILE STATION, NETWORK ELEMENT AND COMMUNICATION SYSTEM

FIELD OF THE INVENTION

The present invention relates to the field of communications, and more particularly to detecting a duplicate address.

BACKGROUND OF THE INVENTION

With the development of mobile/wireless network, personal communication is becoming reality. A user can access any multimedia services at anytime with another user having a mobile terminal. In order to support session based applications like VoIP, video streaming or conference, IPv6 is better to be used. However, the services might be interrupted when the mobile terminals move and handover. How to decrease the handover time and guarantee the QoS is very important.

For mobile IPv6 (MIPv6, RFC3775) enabled nodes, part of the Layer 3 handover delay is contributed by the configuration of the Care-of-Address (CoA) and Duplicate Address Detection (DAD) when the node moves into a visited network. The address configuration and DAD process may add up to a delay of 1 s, which is significant for real-time applications such as VoIP. Hence if we could reduce the time taken by the DAD procedure, the whole Mobile IPv6 handover procedure could be speeded up.

IPv6 (RFC2460) is an Internet Protocol designed for the next generation network. Compared with IPv4, some new features are introduced. Among these new features, the Stateless Address Configuration (RFC2462) allows a host to generate its own IPv6 addresses using a combination of locally available information and information advertised by routers. The routers advertise prefixes that identify the subnet(s) associated with a link, while hosts generate an "interface identifier" that uniquely identifies an interface on a subnet. An address is formed by combining the two. The Routers send Router Advertisements (RA) periodically which contain two flags indicating what type of auto-configuration (if any) should be performed. A "managed address configuration" flag indicates whether the hosts should use stateless auto-configuration to obtain addresses. The RA message also contains zero or more Prefix Information options that provide on-link prefixes for address auto-configuration.

Upon receiving a RA message, the host generates an IPv6 address based on the received Prefix Information. Then the host performs a Duplicate Address Detection (DAD) by sending out a Neighbor Solicitation (NS) message containing the newly generated address. If the address is already used by another host, that host replies with a Neighbor Advertisement (NA) defending the address. Once a defending NA is received, the address auto-configuration process is stopped, and another address is re-generated or a manual configuration is performed.

Once it has sent the NS, the host waits for RetransTimer milliseconds (ms) for a defending NA, and this solicit-and-wait process is repeated DupAddrDetectTransmits times. The default value of RetransTimer is 1000 ms and by default the process is done once, resulting in a default delay of 1000 ms, i.e., 1 second for the DAD.

Some methods have been proposed to reduce the duration time of DAD. For example, Advance Duplicate Address Detection [A-DAD] is proposed by Youn-Hee Han. In this method, each access router maintains "Passive Proxy Cache" of which each address is in advance generated and tested for its uniqueness by the access router. After successfully acquiring the address from the router, the host assigns it on its interface which attaches to the new link, without the RFC 2461 DAD. However, this method is more like the stateful address configuration such as DHCPv6. It lacks the flexibility provided by the stateless address configuration.

In [RFC4429], an Optimistic Duplicate Address Detection is proposed by N. Moore. In this proposal, a new address state, "Optimistic", is introduced. This state is used to mark an address that is available for use but has not completed DAD. The use of the optimistic address is limited, for example, it should not be used as a source address in new communications. However for MIPv6, if the optimistic address is used in the binding update message as the Care-of-Address before the completion of the DAD process, the handover process may be disrupted when a duplicated address is detected.

In [UNDAD], the authors propose a scheme of using the Neighbor Cache Entries (NCE) of the access router for an efficient DAD process. The access routers are required to perform additional functionalities in order to maintain the complete list of nodes present in the subnet in their Neighbor Cache. The IPv6 hosts query the access router about the uniqueness of their auto-configured addresses. The access routers check the neighbor cache for any matching information and respond to the query of the mobile nodes. However, if no duplicated address is found, the host still has to wait for at least RetransTimer before assigning the configured address to itself. Hence the DAD process isn't speeded up.

In [END], the access router maintains an address cache which contains a list of addresses of all connected hosts. To check an address, the MS sends Neighbor Solicitations according to RFC 2461 and RFC 2462. Upon receiving the NS, the access router compares the tentative address in the NS against the entries in its address cache. If there is no match, the access router creates an entry for the (tentative) address in its address cache and sends a special Router Advertisement to the MS indicating the address's uniqueness. If there is a match that indicates that the address is conflict with another host, the access router relays the NS to the address owner without any modification. Upon receiving the NS, the address owner replies with an NA to defend its address. The access router relays the NA to the soliciting MS without any modification. Upon receiving the defending NA, the soliciting MS perceives the address conflict and refrains from assigning the tentative address to the interface. Although this mechanism reduces the DAD process significantly, however, there is still some delay caused by the signaling exchange.

In addition, for the existing mechanism based on Proxy Neighbor Discovery, the address information is learned from the NS message sent by the host during the DAD procedure. However this method is not reliable sometimes. If the address is learned from the NS message, according to [RFC2462], the host may not perform DAD and doesn't send the NS after the address configuration. For example, the address uniqueness is determined solely by the interface identifier, assuming that subnet prefixes are assigned correctly (i.e., if all of an interface's addresses are generated from the same identifier, either all addresses or none of them will be duplicated). Thus, for a set of addresses formed from a same interface identifier, it is sufficient to check that the link-local address generated from the identifier is unique on the link. The DAD is not performed for other addresses derived from the same interface identifier. So in this case, the access router has no way to learn the address information of the host. Thus the information contained in the address cache is not correct.

SUMMARY OF THE INVENTION

To solve the above problem in the prior art, according to an aspect of the present invention, a method for detecting a duplicate address is proposed, wherein a mobile station is moving from a second access network pertaining to a second network element into a first access network pertaining to a first network element. The method comprises: the mobile station sends a request message to the first network element; the first network element generates and sends a first message to the mobile station upon reception of said request message, said first message designating an explicit address configuration and including prefix information; the mobile station checks out the explicit address configuration, generates an address based on said prefix information and sends a message containing the generated address to the first network element for indicating that the mobile station requires registering the generated address with the first network element; and the first network element creates an entry for the mobile station if the generated address is not found in its address table, or generates and sends a second message to the mobile station for indicating that the generated address is a duplicate address if it is found in its address table and discards data packets with the duplicate address sent from the mobile station.

According to another aspect of the present invention, a mobile station moving from a second access network pertaining to a second network element into a first access network pertaining to a first network element is proposed. Said mobile station comprises: a first message check-up means for checking a message sent by the first network element to find if an explicit address configuration is required; a message generation means for generating a message for indicating that the mobile station requires registering an address generated by itself with the first network element, or for indicating that the mobile station requires de-registering the generated address with the first network element when it is about to leave the first access network or stop using the generated address; and a second message check-up means for checking a message sent by the first network element to find if the generated address is a duplicate address.

According to yet another aspect of the present invention, a network element for controlling access of a mobile station to a wide area network is proposed, wherein the mobile station is moving from a second access network pertaining to a second network element into a first access network pertaining to a first network element. Said network element comprises: a first message generation means for generating a message for designating an explicit address configuration and including prefix information; a message check-up means for checking a message sent by the mobile station to find whether the mobile station requires registering an address generated by itself or requires de-registering the generated address; an address table adapted to store an IP address and a link-layer address of the mobile station, as well as life time of the addresses; an address lookup means for looking up the address table for an address generated by the mobile station; an entry creation means for creating an entry for the mobile station if the generated address is not found in the address table; a second message generation means for generating a message for indicating that the generated address is a duplicate address; and a packet discarding means for discarding data packets with the duplicate address sent from the mobile station.

According to yet another aspect of the present invention, a communication network is proposed. Said communication network comprises: a mobile station according to the present invention; and at least two network elements according to the present invention.

BRIEF DESCRIPTION OF THE DRAWINGS

These and many other features and advantages of the present invention will become apparent from the following description of the embodiments of the present invention with reference to the drawings, wherein.

DETAILED DESCRIPTION OF THE INVENTION

Figure 1:
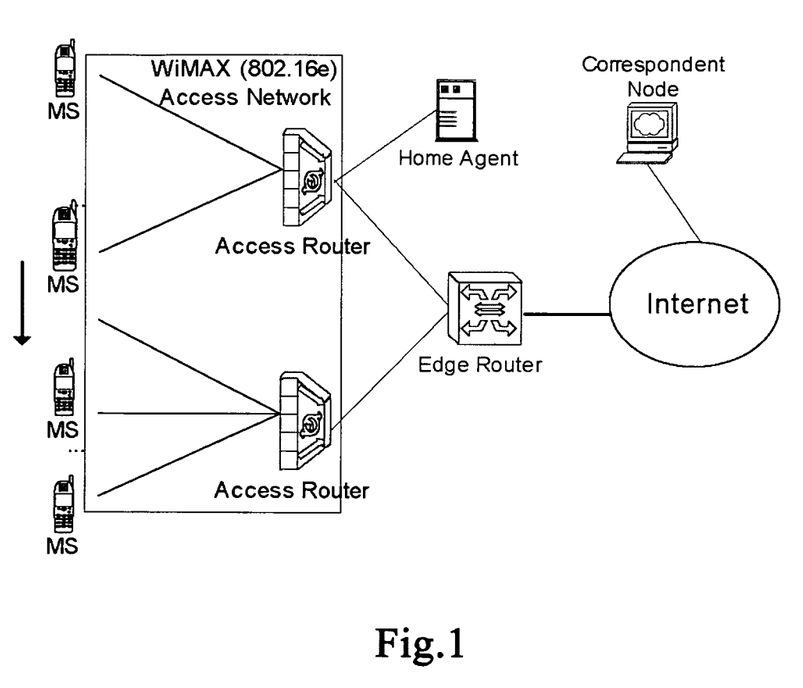
FIG. 1 shows a handover under WiMAX network.

The present invention proposes a method for detecting a duplicate address in a communication network such as a WiMAX network. This method may be for example applied to the access network shown in FIG. 1. With reference to FIG. 1, the basic idea of the present invention is illustrated.

In this invention, an explicitly stateless address auto-configuration and DAD process is proposed to reduce the DAD duration significantly for an access network like a mobile WiMAX network based on the PND (Proxy Neighbor Discovery) mechanism. The mobile WiMAX network is a point-to-multipoint network in which the mobile IPv6 is supported. Therefore, a mobile station (MS) cannot communicate with another MS directly, and all the traffic should go through an access router (ASN-GW) as shown in FIG. 1.

Remember, the PND is often used to handle the neighbor discovery problem in the above networks. The access router maintains an address table which contains a list of IPv6 addresses and corresponding link-layer addresses that are being used by all IPv6 hosts in the same subnet. Upon receiving a NS (Neighbor solicitation) message, the router would relay the NS message to the solicited host or send back a NA (Neighbor Advertisement) message directly on behalf of the solicited host.

In this process, an address table is used to contain the addresses and their corresponding link-layer addresses of all MSs in the same link. Unlike the standard method as defined in RFC 2462, after the stateless address configuration, an explicit NS message is sent to notify the access router. In addition, since the probability of the occurrence of a duplicate address is too small, the DAD process is omitted by the MS. Instead, the access router performs the DAD on behalf of the MS. If a duplicate address is detected, then the access router notifies the MS to re-generate a new address.

In the present invention, the required configurations of the MS and the access router are as follows.

1) MS's Requirements

The MS should set the access router as its default gateway after receiving the modified RA message therefrom, and all communication should go through that access router.

The MS should be able to process the modified messages as defined below.

2) Access Router's Requirements

The access router should maintain an address table. This table contains the MS's IP address, link-layer address, life time and etc.

The access router should process all received NS message with specified and unspecified source address and solicited-node-multicast destination address for DAD and address resolving.

Figure 3:
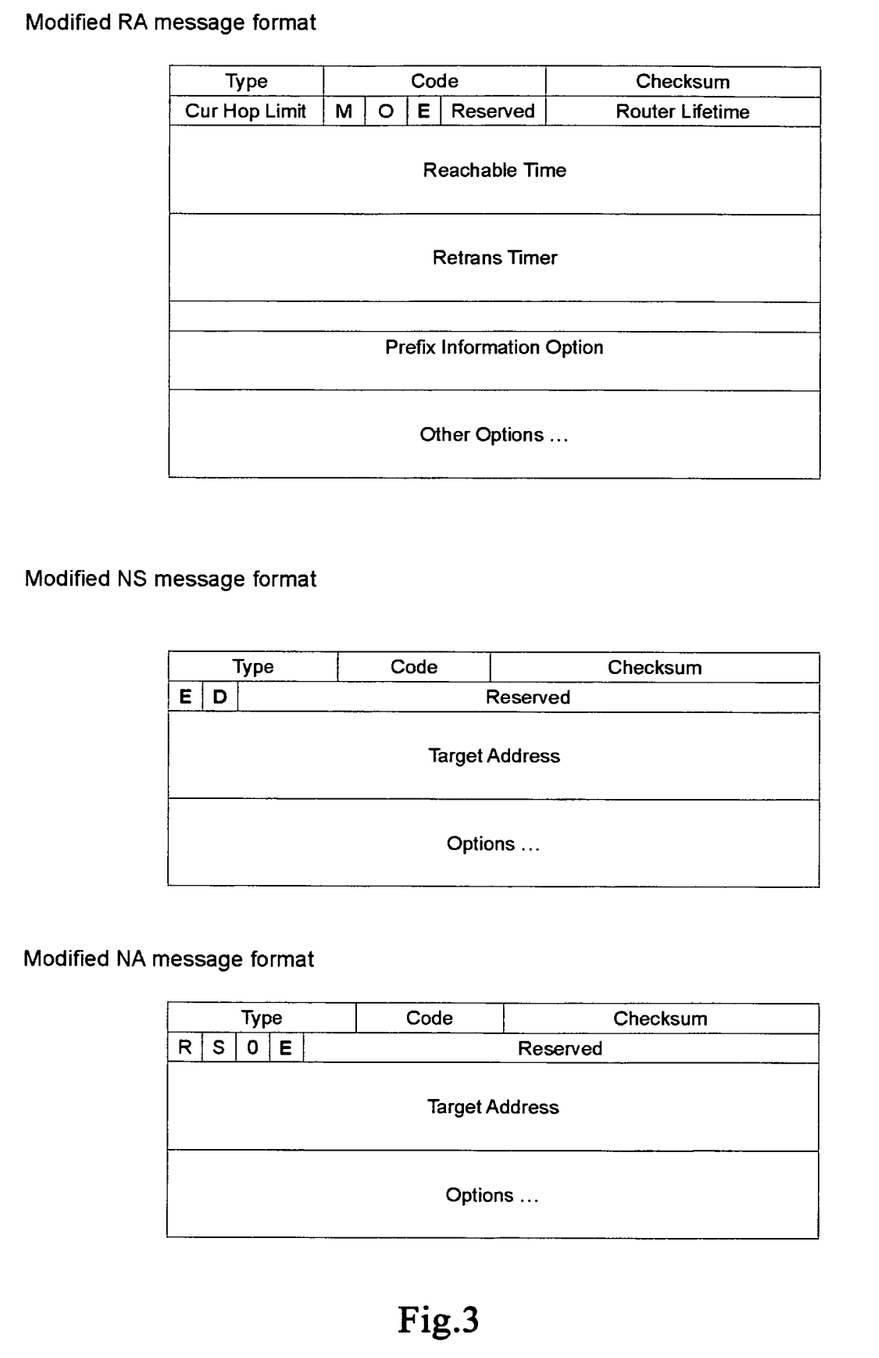
FIG. 3 illustrates those modified messages transferred between the MS and the access router.

Those modified messages are shown in FIG. 3. As shown, in comparison with the RFC standards, the modifications to those messages are as follows.

1) An "E" indication bit is added to the reserved section of the RA message. If the access router wants to request the MS to use the explicit stateless address configuration, it must set the "E" bit of the RA message sent to the MS.

2) An "E" or "D" indication bit is added to the reserved section of the NS message. The "E" bit is set if the MS wants to register its auto-configured stateless address with the access router explicitly. The "D" bit is set if the MS wants to de-register its generated address with the access router explicitly. The "Target Address" is set to the address auto-configured by the MS.

3) An "E" indication bit is added to the reserved section of the NA message. This message is sent to the MS by the access router to indicate that a duplicate address is detected. The "Target Address" is the duplicated address detected by the access router.

Figure 2:
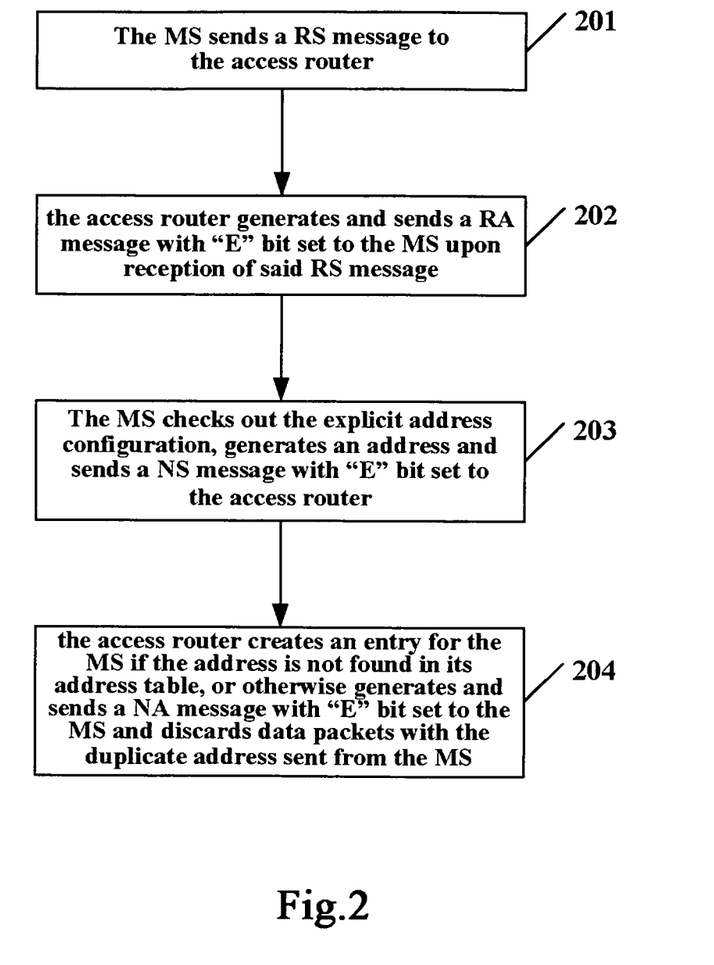
FIG. 2 is a flowchart of the method for detecting a duplicate address according to an embodiment of the present invention.

With reference to FIG. 2, the method for detecting a duplicate address will be described in detail in combination with the access network as shown in FIG. 1 and those modified message format as shown in FIG. 3.

As shown in FIG. 2, firstly, in step 201, when a mobile station (MS) is moving from a second access network pertaining to a second network element into a first access network pertaining to a first network element, after finishing the layer 2 handover, the MS sends a request message to the first network element. Herein, the first and second access networks may be for example the mobile WiMAX network, the first and second network elements may be for example the access routers shown in FIG. 1, and the request message is for example a RS (Router Solicitation) message.

Next, in step 202, the first network element generates and sends a first message to the mobile station upon reception of said request message, which first message designates an explicit address configuration and includes prefix information. Herein, the first message may be for example a modified RA (Router Advertisement) message. In this embodiment, the "E" bit is set in the RA message to indicate the explicit address configuration is used. The RA message is sent periodically or when a RS message is received.

Then, in step 203, the MS checks out the explicit address configuration, generates an address based on said prefix information and sends a message containing the generated address to the first network element for indicating that the mobile station wants to register the generated address with the first network element explicitly. Herein, the address may, be for example a stateless address and the message for indicating the registration may be for example a modified NS (Neighbor Solicitation) message. Meanwhile, the MS also sets the first access router as its default gateway.

Particularly, upon receiving a RA message, the MS should check the "E" bit of the message to find if the explicit stateless address auto-configuration is required. If the 'M' bit isn't set but 'E' bit is set, a stateless IP address is generated according to the procedure defined in RFC 2462. In this method, the "Tentative Address" is not used anymore. The generated address is assigned to the MS's interface as an effective address and an explicit NS message is sent to the access router immediately. In this message, the "E" bit is set to indicate that this is an explicit registration message.

Finally, in step 204, the first network element creates an entry for the mobile station if the generated address is not found in its address table, or generates and sends a second message to the mobile station for indicating that the generated address is a duplicate address if it is found in its address table and discards data packets with the duplicate address sent from the mobile station. Herein, the second message may be for example a modified NA (Neighbor Advertisement) message.

Particularly, upon receiving a NS message, the access router checks if the "E" bit of the message is set. If the "E" bit is set, the access router compares the "Target Address" field in the message against its address table. If there is no match in the address table, the access router creates an entry in the address table to store the "Target Address" and the corresponding link-layer address. If there is a match, the address generated by the MS is conflict with another MS. Then, the access router will send the MS a NA message with "E" bit set to indicate a duplicate address is detected. It should be noted that, before a unique address is re-generated by the MS, all messages sent from the MS must not be forwarded to other nodes, so that the duplicate address doesn't cause problem to other MSs. In addition, the data packets sent by the MS are discarded by the access router once it detects that the generated address is a duplicate address.

Afterwards, if a NA message is received and the 'E' bit is set in the message, the MS compares the "Target Address" with its own generated address. If the two addresses are identical, then a duplicate address is detected by the access router. The MS must abandon the current assigned address and re-generate an address as defined in RFC 2462. Since the router would send the NA message to the MS immediately after the duplicated address is detected, the impact on the MS is small.

Then, if no instruction is obtained from the access router, the MS will continue to use the generated address as the CoA and send a Binding Update (BU) message to register with its home agent as specified in mobile IPv6. If the CoA is not conflict with other MSs, the access router will forward the BU message to the next hop. Otherwise, the BU message is discarded by the access router. Furthermore, the MS must regenerate a new CoA and repeat the above steps.

preferably, when the MS is about to move out from the access network, it will send a NS message with "D" bit set to de-register with the access router explicitly. If the MS does not send that message before leaving, the corresponding entry in the access router will become invalid after its lifetime expires. If the "D" bit is set in the NS message, the access router compares the "Target Address" field in the message against the address table. If there is a match, it will delete the entry that contains the address. If there is no match in the address table, it will just ignore the message.

It should be noted that, after the entry is created, the updating and ageing of the contents of the entry could refer to the neighbor cache maintaining procedure described in RFC 2461.

It should also be noted that, if the MS cannot recognize the "E" and "D" bit in the RA and the NA messages, its behavior would be the same as defined in RFC 2462. As such, if the "E" bit and "D" bit are not set in the received NS message, the NS will be treated as a normal address resolving message. The access router compares the "Target Address" field against the address list. If there is a match, then a normal NA message is sent to the soliciting MS. In this NA message, the "Target Address" field is set to the one in the NS message. If there is no match and the source address of the NS message is unspecified, then the NS message is sent out in the normal DAD process. Then an entry is created to contain the "Target Address" and link-layer address in the NS message. Thus, the access router could support both modified MSs and un-modified MSs.

Thereby, the present invention proposes an efficient method to solve the address auto-configuration and duplicate address detection problem in an IPv6 network. With this explicit stateless address auto-configuration and duplicate address detection process, a MS may get a valid address quickly in handover, the handover delay of a MS being greatly decreased and the QoS of real-time applications such as VoIP and video streaming being improved. It could be used to any network with the mobile IPv6 as the mobility management protocol in layer 3, but the present invention is exclusively not limited to this.

In general terms, the present method has the following advantages over the standard and other solutions:

1) The MS could register its stateless address explicitly with the access router, so that the access router could learn the address reliably and in time.

2) The proposed method can save the Duplicate Address Detection time in the stateless address auto-configuration procedure; this is especially useful for a mobile IPv6 enabled network.

3) The proposed method can co-exist with the standard solution. For those MSs and access routers that cannot implement the method as described above, they could just ignore these options and process these messages as defined in the related RFCs.

Based on the same inventive concept, according to another aspect of the present invention, a mobile station is proposed. The MS will be described in the following with reference to FIG. 4.

Figure 4:
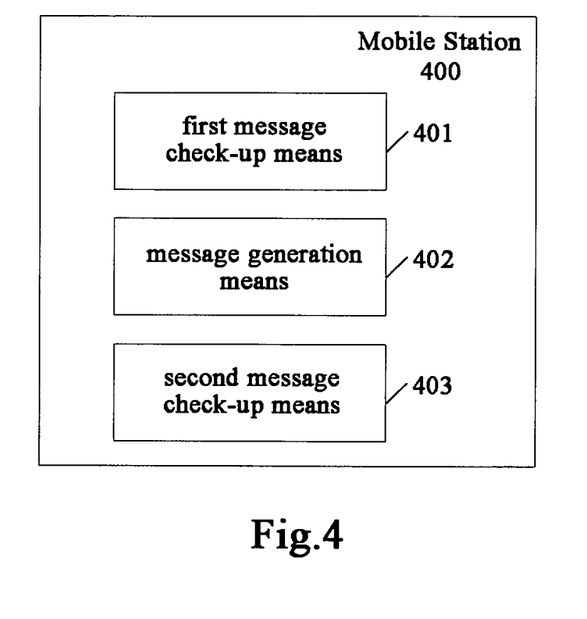
FIG. 4 is a block diagram of the mobile station according to an embodiment of the present invention.

FIG. 4 is a block diagram of the mobile station according to an embodiment of the present invention, which may be for example a mobile phone, a personal digital assistant or the like and support for example the mobile IPv6 protocol. The MS 400 includes a first message check-up means 401 for checking a message sent by the first network element to find if an explicit address configuration is required; a message generation means 402 for generating a message for indicating that the mobile station wants to register the generated address with the first network element explicitly or for indicating that the mobile station wants to de-register the generated address with the first network element when it is about to leave the first access network or stop using the generated address; and a second message check-up means 403 for checking a message sent by the first network element to find if the generated address is a duplicate address.

With reference to FIGS. 1 and 2 again, in this embodiment, when the MS is moving into a new access network and sends a RS message to the current access router, it will receive a RA message from that access router as reply. Then, the first message check-up means 401 will check the RA message to find if a "E" bit is set therein. If the "E" bit is set, the MS will generate a stateless address based on the prefix information extracted from the RA message. Then, the message generation means 402 will generate a NS message with "E" bit set for indicating that the mobile station wants to register the generated address with the first network element explicitly. After receiving the NS message, the access router looks up in its address table the generated address contained in the NS message. If a duplicate address is found, the access router will send a NA message with "E" bit set to the MS. Then, the second message check-up means 403 checks the NA message to find if the generated address is a duplicate address. Furthermore, if the MS wants to de-register the generated address with the access router when it is about to leave the current access network or stop using the generated address, the message generation means 402 will generate a NS message with "D" bit set, which will be sent to the access router by the MS.

It should be noted that, if the MS cannot recognize the "E" and "D" bit in the RA and the NA messages, its behavior would be the same as defined in RFC 2462.

In implementation, the mobile station 400 of this embodiment as well as the first message check-up means 401, the message generation means 402 and the second message check-up means 403 it includes, may be implemented in software, hardware or a combination of them. For example, those skilled in the art are familiar with a variety of devices which may be used to implement these components, such as micro-processor, micro-controller, ASIC, PLD and/or FPGA etc.

In operation, the mobile station 400 of the embodiment illustrated in connection with FIG. 4, may solve the address auto-configuration and duplicate address detection problem in an IPv6 network. With this explicit stateless address auto-configuration and duplicate address detection process, a MS may get a valid address quickly in handover, the handover delay of a MS being greatly decreased and the QoS of real-time applications such as VoIP and video streaming being improved. It could be used to any network with the mobile IPv6 as the mobility management protocol in layer 3, but the present invention is exclusively not limited to this.

Based on the same inventive concept, according to yet another aspect of the present invention, a network element for controlling access of a mobile station to a wide area network is proposed. The network element will be described in the following with reference to FIG. 5.

Figure 5:
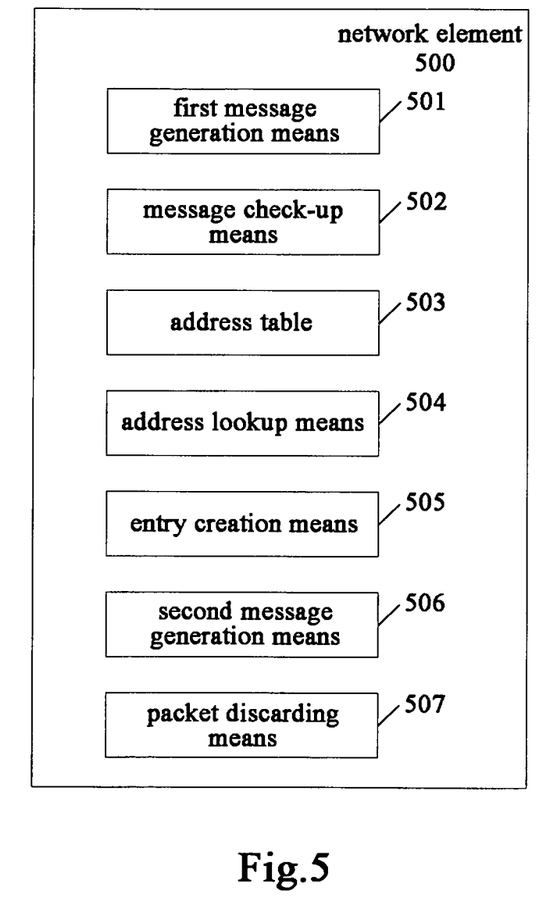
FIG. 5 is a block diagram of the network element according to an embodiment of the present invention.

FIG. 5 is a block diagram of the network element according to an embodiment of the present invention, which may be an access router and support for example the mobile IPv6 protocol. The network element 500 includes: a first message generation means 501 for generating a message for designating an explicit address configuration and including prefix information; a message check-up means 502 for checking a message sent by the mobile station to find whether the mobile station wants to register an address generated by itself explicitly or wants to de-register the generated address explicitly; an address table 503 adapted to store the address and link-layer address of the mobile station, as well as the life time of the addresses; an address lookup means 504 for looking up the address table for the generated address; an entry creation means 505 for creating an entry for the mobile station if the generated address is not found in the address table; a second message generation means 506 for generating a message for indicating that the generated address is a duplicate address; and a packet discarding means 507 for discarding data packets with the duplicate address sent from the mobile station.

With reference to FIGS. 1 and 2 again, in this embodiment, when the MS is moving into a new access network and sends a RS message to the current access router, the first message generation means 501 will generate a RA message with "E" bit set to designate the explicit address configuration, which RA message contains also the "Prefix Information" option. Then, the MS generates a stateless address and sends an explicit NS message to the access router. Upon the reception of the NS message, the message check-up means 502 checks that message to find whether the MS wants to register the generated address explicitly or to de-register the generated address explicitly. If the MS wants to register the address with the access router, i.e. a NS message with "E" bit set being received by the access router, the address lookup means 504 will look up the address table 503 for the generated address. If not found, the entry creation means 505 creates an entry for the MS comprising the CoA and link-layer address of the MS. If found, the second message generation means 506 generates a NA message with "E" bit set. Then, the packet discarding means 507 will discard the data packets with the duplicate address sent from the MS. In this way, after receiving that NA message, the MS will abandon the generated address and regenerate a new stateless address for detection by the access router. Therefore, the sent data packets will have the new stateless address.

As a variant, the access router further comprises an entry deleting means (not shown) for deleting the entry when the mobile station requires deregistering the generated address and the generated address is found in said address table. That is to say, in case that the MS wants to de-register the generated address with the access router, i.e. a NS message with "D" bit set being received by the access router, the address lookup means 504 looks up the address table for the "Target Address" field in that message. If there is a match, the entry deleting means will delete the entry; otherwise just ignore that message.

It should be noted that, after the entry is created, the updating and ageing of the contents of the entry could refer to the neighbor cache maintaining procedure described in RFC 2461.

It should also be noted that, if the "E" bit and "D" bit are not set in the received NS message, the NS will be treated as a normal address resolving message. Thus, the access router could support both modified MSs and un-modified MSs.

In implementation, the network element 500 of this embodiment as well as the first message generation means 501, the message check-up means 502, the address table 503, the address lookup means 504, the entry creation means 505, the second message generation means 506 and the packet discarding means 507 it includes, may be implemented in software, hardware or a combination of them. For example, those skilled in the art are familiar with a variety of devices which may be used to implement these components, such as micro-processor, micro-controller, ASIC, PLD and/or FPGA etc.

In operation, the network element 500 of the embodiment illustrated in connection with FIG. 5, may solve the address auto-configuration and duplicate address detection problem in an IPv6 network. With this explicit stateless address auto-configuration and duplicate address detection process, a MS may get a valid address quickly in handover, the handover delay of a MS being greatly decreased and the QoS of real-time applications such as VoIP and video streaming being improved. It could be used to any network with the mobile IPv6 as the mobility management protocol in layer 3, but the present invention is exclusively not limited to this.

In addition, based on the same inventive concept, according to yet another aspect of the present invention, a communication network is proposed. Such a communication network includes a mobile station and at least two network elements as described in the above embodiments. Furthermore, this communication network may also include other network elements, such as a home agent or an edge router.

In such a communication network, a MS may get a valid address quickly in handover, the handover delay of a MS being greatly decreased and the QoS of real-time applications such as VoIP and video streaming being improved.

Although the exemplary embodiments of the method for detecting a duplicate address, the mobile station, the network element for controlling access of a mobile station to a wide area network and the communication network comprising a mobile station and at least two network elements of the present invention are described above in detail, the above embodiments are not exhaustive, and those skilled in the art can make numerous changes and modifications within the spirit and scope of the present invention. Therefore, the present invention is not limited to those embodiments, the scope of which is defined only by the appended claims.

The invention claimed is:

1. A method for detecting a duplicate address, wherein a mobile station is moving from a second access network pertaining to a second network element into a first access network pertaining to a first network element, comprising:
   receiving, by the first network element, a request message from the mobile station;
   sending, by the first network element, a first message to the mobile station upon reception of said request message, said first message designating an explicit address configuration and including prefix information;
   receiving, by the first network element, a message containing an address generated based on said prefix information by the mobile station, the mobile station presuming the generated address is a valid address, the message indicating that the mobile station requires registration of the generated address with the first network element without the first network element waiting for confirmation on a uniqueness of the generated address from other network elements, which has been presumed a valid address by the mobile station; and
   creating, by the first network element, an entry for the mobile station if the generated address is not found in its address table without waiting for the confirmation on the uniqueness of the generated address from the other network elements, or generating a second message and sending the second message to the mobile station for indicating that the generated address is a duplicate address if it is found in its address table and discarding data packets with the duplicate address sent from the mobile station.

2. The method according to claim 1, wherein the mobile station performs one or more of the followings operations: regenerating a new address and repeats those steps of claim 1 upon reception of said second message for indicating that the generated address is a duplicate address; sending a message for de-registering the generated address with the first network element when it is about to leave the first access network or stop using the generated address; and setting the first network element as its default gateway while generating said address based on said prefix information.

3. The method according to claim 1, wherein said entry is invalid after its lifetime expires if the first network element does not receive from the mobile station a message for deregistering the generated address with the first network element.

4. The method according to claim 1, wherein said entry contains a care of address and a corresponding link-layer address of the mobile station, and/or check-up of a message includes check-up of a specific field of the message.

5. The method according to claim 1, wherein the first network element deletes said entry if a match between the generated address and its address table is found, upon receiving from the mobile station said message for de-registering, or ignore said message for de-registering if no match is found.

6. The method according to claim 1, wherein said address table includes an IP address, a link-layer address of the mobile station and a life time of the addresses, and/or said address is a stateless address.

7. A mobile station moving from a second access network pertaining to a second network element into a first access network pertaining to a first network element, comprising:

first message generation means for generating a request message and sending the request message to the first network element;

first message check-up means for checking a message sent by the first network element in response to the request message, to find if an explicit address configuration is required;

second message generation means for generating a message for indicating that the mobile station requires registering an address generated by itself with the first network element without the first network element waiting for confirmation on a uniqueness of the generated address from other network elements, or for indicating that the mobile station requires de-registering the generated address with the first network element when it is about to leave the first access network or stop using the generated address; and second message check-up means for checking a message sent by the first network element to find if the generated address which has been presumed a valid address by the mobile station has been subsequently determined by the first network to be a duplicate address.

8. The mobile station according to claim 7, wherein the mobile station abandons the generated address and regenerates a new address when a duplicate address is detected by the first network element, and/or said address is a stateless address.

9. The mobile station according to claim 7, wherein checking the message includes check-up of a specific field of the message.

10. A network element for controlling access of a mobile station to a wide area network, wherein the mobile station is moving from a second access network pertaining to a second network element into a first access network pertaining to a first network element, comprising:

message receiving means for receiving a request message from the mobile station; first message generation means for generating a message, in response to receiving the request message, for designating an explicit address configuration and including prefix information;

message check-up means for checking a message sent by the mobile station to find whether the mobile station requires registration of an address generated by itself without the network element waiting for confirmation on a uniqueness of the address from other network elements or requires de-registering the generated address;

an address table adapted to store an IP address and a link-layer address of the mobile station, as well as life time of the addresses;

address lookup means for looking up the address table for an address generated by the mobile station which has been presumed a valid address by the mobile station;

entry creation means for creating an entry for the mobile station if the generated address is not found in the address table;

second message generation means for generating a message for indicating that the generated address, which the mobile station is presently using as an identification, is a duplicate address; and packet discarding means for discarding data packets with the duplicate address sent from the mobile station.

11. The network element according to claim 10, further comprising:

entry deleting means for deleting the entry when the mobile station requires deregistering the generated address and the generated address is found in said address table.

12. The network element according to claim 10, wherein said entry is invalid after its lifetime expires if the network element does not receive from the mobile station said message for deregistering the generated address.

13. The network element according to claim 10, wherein said entry contains a care of address and a corresponding link-layer address of the mobile station.

14. The network element according to claim 10, wherein the checking the message includes a check-up of a specific field of the message, and/or said address is a stateless address.

* * * * *